(12) United States Patent
Liang

(10) Patent No.: US 11,394,568 B2
(45) Date of Patent: Jul. 19, 2022

(54) METHOD FOR AVOIDING BANDWIDTH SHORTAGE FOR ONLINE MEETINGS

(71) Applicant: Spotify AB, Stockholm (SE)

(72) Inventor: Hongxin Liang, Stockholm (SE)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 17/232,564

(22) Filed: Apr. 16, 2021

(65) Prior Publication Data
US 2022/0070012 A1 Mar. 3, 2022

(30) Foreign Application Priority Data

Aug. 28, 2020 (EP) .................................... 20193326

(51) Int. Cl.
 *G06F 15/16* (2006.01)
 *H04L 12/18* (2006.01)
 *H04N 7/15* (2006.01)
(52) U.S. Cl.
 CPC ...... *H04L 12/1818* (2013.01); *H04L 12/1831* (2013.01); *H04N 7/152* (2013.01)
(58) Field of Classification Search
 None
 See application file for complete search history.

(56) References Cited

U.S. PATENT DOCUMENTS

| 8,375,421 B1 | 2/2013 | Shigapov et al. |
| 2004/0246332 A1 | 12/2004 | Crouch |
| 2006/0265262 A1* | 11/2006 | Kamdar ............... G06Q 50/188 705/80 |
| 2007/0233291 A1* | 10/2007 | Herde ................... G06Q 10/10 700/91 |
| 2008/0126943 A1* | 5/2008 | Parasnis ................ G06Q 10/10 715/730 |

(Continued)

FOREIGN PATENT DOCUMENTS

WO WO-2005029372 A1 * 3/2005 ............ G06Q 10/10

OTHER PUBLICATIONS

Spotify AB, Extended European Search Report, EP20193326.4, dated Jan. 14, 2021, 9 pgs.

*Primary Examiner* — Phyllis A Book
(74) *Attorney, Agent, or Firm* — Morgan, Lewis & Bockius LLP

(57) ABSTRACT

The present disclosure relates to a method for avoiding bandwidth shortage for online meetings in a communication network. The method comprises, via an online event scheduling system, receiving a meeting request for an online meeting from an organizer, said request comprising information about a time slot for said online meeting. The method also comprises determining whether an organization which the organizer belongs to has a meeting token available for said time slot and said number of participants. The method also comprises sending an acknowledgement to the event scheduling system, allowing the event scheduling system to book the online meeting for the participants in the event scheduling system. A finite number of meeting tokens has been provided to the organization based on a communication bandwidth available for said organization, such that a maximum number of concurrent online meetings in the organization is limited by the finite number of meeting tokens.

15 Claims, 2 Drawing Sheets

(56) References Cited

U.S. PATENT DOCUMENTS

| | | | |
|---|---|---|---|
| 2009/0015659 A1* | 1/2009 | Choi | H04N 7/152 348/14.09 |
| 2010/0121666 A1* | 5/2010 | Niazi | G06Q 10/109 705/7.27 |
| 2011/0023096 A1* | 1/2011 | Xiao | H04L 63/0236 709/224 |
| 2013/0339452 A1* | 12/2013 | Shaikh | G06Q 50/01 709/205 |
| 2014/0280595 A1* | 9/2014 | Mani | H04L 65/403 709/204 |
| 2015/0200982 A1* | 7/2015 | Velagaleti | G06F 3/0481 715/753 |
| 2015/0356516 A1* | 12/2015 | Kagan | G06Q 10/1095 705/7.19 |
| 2016/0055459 A1 | 2/2016 | Hill | |
| 2016/0063449 A1* | 3/2016 | Duggan | G06Q 10/1095 705/7.19 |
| 2016/0105472 A1* | 4/2016 | Chitroda | H04L 65/4038 709/204 |
| 2016/0156570 A1 | 6/2016 | Mori | |
| 2017/0024699 A1* | 1/2017 | Millership | G06Q 50/01 |
| 2019/0068389 A1* | 2/2019 | Chitre | H04L 12/1863 |
| 2019/0305976 A1* | 10/2019 | Bender | G10L 15/1807 |
| 2020/0372140 A1* | 11/2020 | Jaber | H04L 12/1822 |
| 2021/0083889 A1* | 3/2021 | Chakra | H04L 12/1818 |
| 2022/0021680 A1* | 1/2022 | Roedel | H04L 12/1822 |

\* cited by examiner

METHOD FOR AVOIDING BANDWIDTH SHORTAGE FOR ONLINE MEETINGS

PRIORITY APPLICATION

This application claims priority to European Application EP 20193326, filed Aug. 28, 2020, which is hereby incorporated by reference in its entirety.

TECHNICAL FIELD

The present disclosure relates to a method for avoiding bandwidth shortage for online meetings in a communication network.

BACKGROUND

Over time, more and more meetings are held online, e.g. as video or multimedia meetings, rather than in person. Online meetings require higher bandwidth to be available, e.g. for meetings over the Internet or over a Local Area Network (LAN). Further, the technical quality of online meetings is improving, requiring higher bandwidth for enabling use of the higher quality which is technically available for a meeting. At popular meeting times, e.g. ten o'clock in the morning, many concurrent online meetings in an organization may lead to congestion and reduced online meeting quality due to temporary bandwidth shortage.

Also, since the booking of an online meeting is not dependent on availability of a physical meeting room and does not have to allow for time for participants to move from one place to another, there may be an increased risk of meeting fatigue or medical problems associated with immobility of participants.

SUMMARY

It is an objective of the present invention to avoid bandwidth shortage for online meetings in a communication network.

According to an aspect of the present invention, there is provided a method for avoiding bandwidth shortage for online meetings in a communication network. The method comprises, via an online event scheduling system, receiving a meeting request for an online meeting from an organizer, said request comprising information about a time slot for and a number of participants of said online meeting. The method also comprises, in response to the received meeting request, determining whether an organization which the organizer belongs to has a meeting token available for said time slot and said number of participants. The method also comprises allocating the available meeting token to the requested online meeting. The method also comprises sending an acknowledgement to the event scheduling system, allowing the event scheduling system to book the online meeting for the participants in the event scheduling system. A finite number of meeting tokens, including the allocated meeting token, has been provided to the organization based on a communication bandwidth available for said organization, such that a maximum number of concurrent online meetings in the organization is limited by the finite number of meeting tokens, each provided meeting token having a size specifying a maximum number of participants of an online meeting for which it can be allocated.

According to another aspect of the present invention, there is provided a computer program product comprising computer-executable components for causing a computing system to perform an embodiment of the method of the present disclosure when the computer-executable components are run on processing circuitry comprised in the device.

According to another aspect of the present invention, there is provided a computing system comprising processing circuitry and storage storing instructions executable by said processing circuitry whereby said computing system is operative to perform an embodiment of the method of the present disclosure.

By limiting the number of concurrent online meetings within an organization, by means of a finite number of meeting tokens being available to the organization, the risk of bandwidth shortage at any point in time is reduced. By additionally specifying the maximum number of participants for each meeting token, the risk of bandwidth shortage is further reduced. As a result, the online meetings of the organization, especially meetings with many participants, will be spread out over time, more efficiently making use of the available bandwidth.

By enabling the online meeting to be booked in the event scheduling system, e.g. an online calendar, after the allocating of the available meeting token to the requested online meeting, the organizer can directly when booking the online meeting in the event scheduling system make sure that the meeting can take place in view of the finite number of, and sizes of, meeting tokens provided to the organization.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
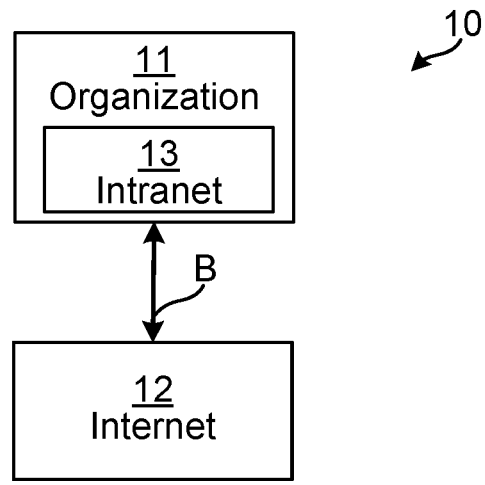
FIG. 1 is a schematic block diagram of a communication network, in accordance with some embodiments of the present invention.

FIG. 1 illustrates a communication network 10 comprising an organization 11. The organization may comprise an intranet 13 using any wired or wireless communication method such as a LAN and may communicate externally via e.g. the Internet 12. The bandwidth B (i.e. maximum possible rate of data transfer over a given path) discussed herein may be the bandwidth for the connection between the organization 11, e.g. the intranet 13 thereof, and an external network, e.g. the Internet 12, as illustrated in FIG. 1. Alternatively, the bandwidth B may be for organization internal communications, e.g. within the intranet 13, e.g. for organization internal online meetings (with few or no external participants).

Figure 2:
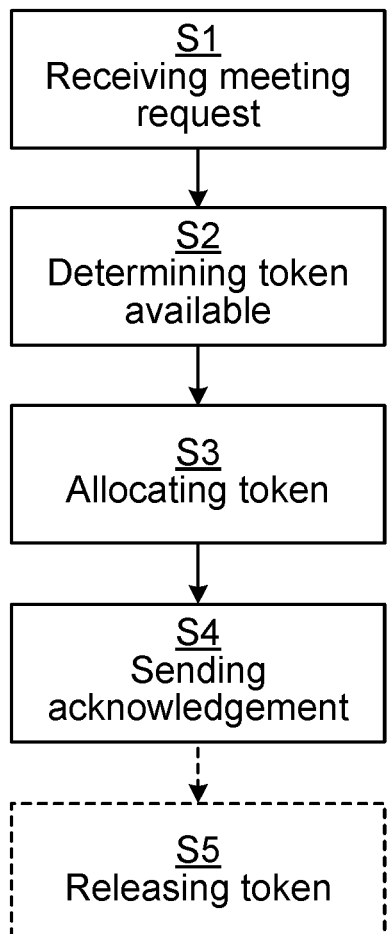
FIG. 2 is a schematic flow chart of a method in accordance with some embodiments of the present invention.

FIG. 2 is a flow chart illustrating some embodiments of the method for avoiding bandwidth shortage for online meetings in a communication network 10, of the present invention. The method may be performed in/by a token computing system 1 e.g., comprising a token allocator 4 and/or a token management 5 (see FIG. 3). Via the online event scheduling system 3, a meeting request 301 and/or 302 is received S1 for an online meeting from an organizer 2 (typically a computing device of a person organizing the meeting). The request comprises information about a time slot for and a number of participants of said online meeting. In response to the received S1 meeting request it is determined S2 whether an organization 11 which the organizer belongs to has a meeting token 303 available for said time slot and said number of participants. Provided that it is determined S2 that a meeting token is available, the available meeting token 311 is allocated S3 to the requested online meeting. After the allocating S3, an acknowledgement 313 is sent S4 to the event scheduling system 3, allowing and/or enabling the event scheduling system to book the online meeting for the participants in the event scheduling system. Optionally, the allocated S3 meeting token is then released S5 when the online meeting is finished. In some embodiments, the method comprises the event scheduling system 3 booking the online meeting for the participants in said event scheduling system in response to the sent S4 acknowledgement. As discussed herein, a finite number of meeting tokens, including the allocated meeting token, has been provided to the organization based on a communication bandwidth B available for said organization 11, such that a maximum number of concurrent online meetings in the organization is limited by the finite number of meeting tokens, each provided meeting token having a size specifying a maximum number of participants of an online meeting for which it can be allocated. Thus, the determining S2 typically comprises determining that the meeting token is available in view of the finite number of meeting tokens available to the organization. In some embodiments, the method is performed by a token handling computing system 1, e.g. of a service provider providing a token handling service, or by a computing system 6 also comprising the event scheduling system 3, as discussed further below with reference to FIG. 3.

In accordance with the present invention, the number of meeting tokens provided to the organization 11 is limited and predetermined. Thus, the number of concurrent online meetings in the organization is limited by the provided number of meeting tokens. For instance, the number of possible concurrent online meetings allowed for the organization may be the same as the number of meeting tokens provided to the organization, since a meeting token cannot be allocated to more than one online meeting at any point in time. In some embodiments, a meeting token is required to initiate (e.g., or join) a shared playback session. In some embodiments, each user of a media-providing service is provided with a predefined number of meeting tokens (e.g., each user may participate in N-number of playback sessions at a particular time, where N is an integer and represents the number of meeting tokens for the respective user).

In some embodiments, each meeting token has a size which specifies a maximum number of participants of an online meeting (e.g., including a shared playback session) for which it can be allocated. For instance, each meeting token may have a size corresponding to a maximum of 2, 5, 10 or 50 participants for an online meeting for which it can be allocated. It is here envisioned that each participant has its own connection to the online meeting. However, there may be no limit to the number of persons who share a connection (e.g. connecting from a meeting room) since this would not affect the bandwidth requirement for the online meeting. In some embodiments, each of the provided meeting tokens are of the same size. In some embodiments, the size of the token indicates a number of participants that may join the meeting. For example, each token enables a same number of participants to join the online meeting. However, it may be more preferred to have different sizes of the provided meeting tokens, e.g. providing many meeting tokens of a small size (e.g. for a maximum of 2 or 5 participants) while only one or a few of the provided meeting tokens are of a large size (e.g. for a maximum of 10 or 50 participants, or for an infinite number of participants), thus allowing only one or a few large online meetings to occur concurrently while not preventing small, e.g. one-on-one, meetings with small bandwidth requirements from taking place.

Typically, each online meeting is a multimedia meeting, combining different forms of media such as text, audio, images, animations, video and/or interactive content to be shared among the participants. Such multimedia meetings require more bandwidth than e.g. text messaging or voice communication. In some embodiments of the present invention, the online meeting comprises streaming live video, e.g. for a video conference. Additionally or alternatively, in some embodiments of the present invention, the online meeting comprises a shared playback session in which media content, such as audio, is played from a playlist shared among the participants of the online meeting. Typically, the playlist comprises audio tracks, e.g. songs or music tracks, and the playlist may be edited by one, some or all of the participants in the online meeting.

Figure 3:
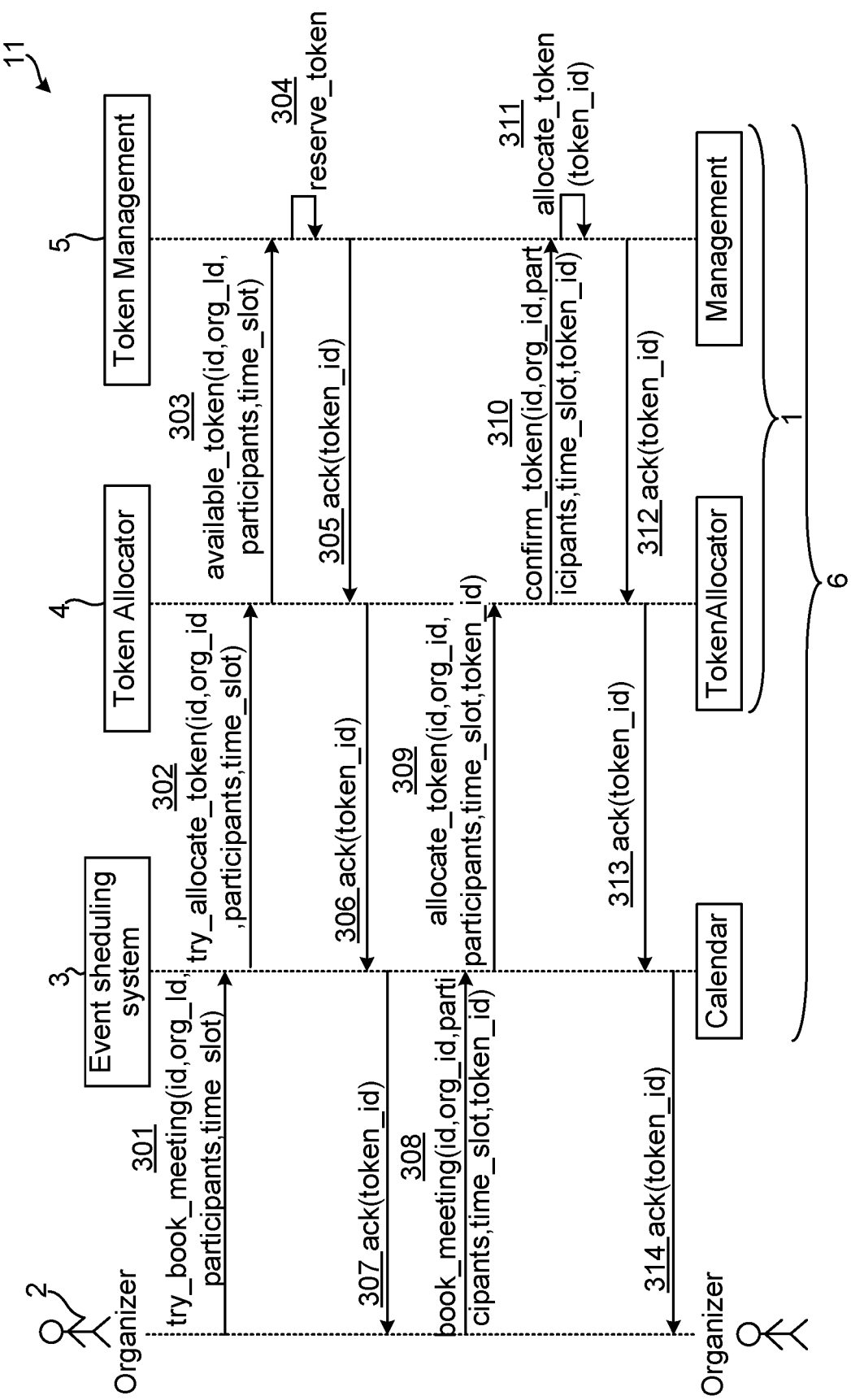
FIG. 3 is a schematic signalling diagram illustrating some embodiments of the present invention.

FIG. 3 illustrates a signalling diagram of a possible signalling sequence for some embodiments of the present invention.

With the intention of booking an online meeting (e.g., including initiating a shared playback session), an organizer 2 of the organization 11 may send a meeting request 301 to its online event scheduling system 3, e.g., an online calendar, here as the signal try book meeting comprising information about the meeting e.g., organizer identifier (ID), here in the parameter "id"; organization ID of the organization 11 which the organizer 2 belongs to, here in the parameter "org_id"; number and/or ID of the participants, here in the parameter "participants"; and/or the intended time slot for the meeting, here in the parameter "time_slot". The event scheduling system 3 forwards the meeting request 302, including the information in the parameters, here as the signal try allocate token to a token allocator 4. The token allocator 4 determines that there is an available token for the requested time slot and the requested number of participants and forwards the meeting request 303, including the information in the parameters, here as the signal available token to the token management 5 which reserves 304 the token. Cascaded acknowledgements 305, 306 and 307, including information about the token ID (here in the parameter "token_id"), may then be sent to the token allocator 4, the event scheduling system 3 and the organizer 2, respectively.

In some embodiments, the organizer 2 comprises a first user of a media-providing service. In some embodiments, the organizer sends a meeting request to initiate a shared playback session. For example, the first user sends a request to an online event scheduling system 3 corresponding to the media-providing service. In some embodiments, the event scheduling system is stored at a server system of the media-providing service. In some embodiments, the participants comprise one or more additional users of the media-providing service.

Being thus informed via the event scheduling system 3 that a meeting token is available for an online meeting at the requested time and for the requested number of participants, the organizer 2 may then book 308 the meeting in the event scheduling system 3, here by sending the signal book_meeting now also comprising information about the token ID of the reserved 304 token. This booking request 309 is forwarded, here as the signal allocate token, to the token allocator 4 which then forwards it 310, here as the signal confirm token, to the token management 5 which allocates 311 the token to the online meeting. Cascaded acknowledgements 312, 313 and 314, including information about the token ID (here in the parameter "token_id"), may then be sent to the token allocator 4, the event scheduling system 3 and the organizer 2, respectively.

In some embodiments, the event scheduling system 3 (e.g., and/or the organizer 2) notifies one or more participants that a meeting has been scheduled. For example, in some embodiments, after reserving 304 and/or allocating 311 the token to the online meeting, the organizer (e.g., and/or invited participants) is notified that the meeting has been approved.

The online event scheduling system 3, typically a calendar, may be run locally on a computer device (e.g. desktop computer, tablet computer or smartphone) of the organizer 2, on a server system within the organization 11 (typically connected with the organizer via the LAN 13), on an external, e.g. cloud-based, server system, or on any other computer system.

Similarly, the token allocator 4 and the token management 5 may be run on the same or separate server and/or computing system(s) within the organization 11 or externally of the organization, e.g. cloud-based and/or by a service provider 1 providing a token handling system. In some embodiments, the event scheduling system 3, the token allocator 4 and the token management 5 functions are all provided on the same server and/or computing system 6 within or outside of the organization 11. The token allocator 4 and token management 5 functionalities may in some embodiments be performed by the same computing device or system 1. Possibly, the token allocator 4 and token management 5 functionalities may be performed by the same computing device or system 6 as performs the event scheduling system 3 functionalities. The token management 5 may comprise functionalities such as managing the meeting tokens provided to the organization and/or the size of each of said tokens. The token management 5 may then be regarded as an inventory management system. In contrast, the token allocator 4 may comprise functionalities to do more complicated computation to understand whether to approve the allocation request and/or what size of token is needed for the online meeting.

According to the sequence of FIG. 3, a meeting token is first reserved 304 and then allocated 311. However, in some other embodiments of the present invention, the token may be allocated directly at step 304, obviating the need for steps 308-314. The two-step approach of first reserving and then allocating a token may be used for first booking the meeting (without allocating resources for the meeting) and then performing the meeting (including allocating and using resources therefore).

In addition to reducing the risk of bandwidth shortage, the use of meeting tokens to limit the number of possible concurrent online meetings within an organization 11 may alleviate problems with meeting fatigue within the organization since the number of meetings are now limited in a similar way as when using physical meeting rooms. For example, the number of possible concurrent shared playback sessions supported by the media-providing service is limited based on how many tokens are provided to users of the media-providing service.

As discussed above, there is a limited number of meeting tokens available at any time of the day and each token can be requested 301-303 and allocated 311 for the requested time period only if a meeting token is available, and only if the meeting token is successfully allocated can the organizer 2 book the online meeting. Typically, each meeting token has a unique ID so it is traceable, and each meeting token cannot be allocated to more than one meeting at any time.

In some embodiments, the number of meeting tokens provided to the organization 11 can depend on the organization. The organization may e.g. be a company, a department, a team, a building, a floor, a media-providing service, a family, a group (e.g., of subscribers to the media-providing service) that shares media sessions, or friends within a social network. The organization 11 may have a nested structure and an administrator of a higher level of the hierarchy may decide the number of meeting tokens provided to lower levels.

In some embodiments, the finite number of meeting tokens may be determined based on the accumulated meeting time of online meetings during a predetermined time period, e.g. a day, week, month or year, for the organizer 2 and/or for any of the other participant(s). For example, the organization 11 determines an amount of time a respective user has consumed media content (e.g., from a playback history that is stored for each respective user). The organization provides, in some embodiments, more available tokens to users that have the largest amount of time of using the media-providing service (e.g., based on the playback histories). In some embodiments, the organization provides fewer tokens to users that have the largest amount of time of using the media-providing service (e.g., to limit the consumption of those users). In some embodiments, the organization determines a number of tokens to provide to a respective user based on other factors of the user (e.g., as stored in a user profile), such as a type of account (e.g., premium or free).

In some embodiments, the number of meeting tokens provided to the organization 11 may be computed dynamically based on seasons, or in a burst mode. For example, the first quarter of the year may have more tokens provided than the Summer holiday season. At the beginning of a quarter when a lot of planning happens, the number of tokens provided may be increased temporarily. In some embodiments, the number of meeting tokens provided to the organization is computed based on a time of day and/or a geography of the participants. For example, more tokens are available during working hours (e.g., based on a time zone as determined from the geography of the participants).

In some embodiments, two meeting token holders, i.e. organizers 2, may exchange meeting tokens. This exchange may be done in an atomic way so there is no release and re-allocation of the tokens. In this case, there may be no possibility for a third organizer to gain access to any of the meeting tokens during the exchange.

In some embodiments, a meeting token may be temporarily withdrawn if the request time period is too long, e.g. for a two hours meeting. When a meeting token is withdrawn temporarily, the meeting session may be paused and no communication be done during the pause.

In some embodiments, a meeting token may only be allocated to a meeting requested 301 by an organizer 2 with a proof-of-work. For example, a number of valid recent GitHub commits can be used to enable allocation of a certain number, and/or size, of meeting tokens for the organizer. In some embodiments, the proof-of-work may be in the form of a number of steps walked, or other exercise such as jogging, stretching, etc., which may reduce risk of meeting fatigue or other office-related health issues. The steps may e.g. be measured by a wearable device and e.g. provided to the token allocator 4 via the LAN 13 and/or the Internet 12.

In some embodiments, there may be a minimum waiting time, e.g. 30 minutes, between online meetings for the organizer 2 and/or any other participant(s). This may further reduce the risk of meeting fatigue or other health issues by avoiding back-to-back meetings. The minimum waiting time may be configured by an administrator or dynamically set based on the meeting organizer's 2 schedule of the day, and/or the respective schedules of the other participants. In some embodiments, the minimum waiting time during a time period for an organizer 2 may depend on the number of online meetings said organizer is scheduled to participate in during said time period, e.g. a day, week or month. The relationship between the number of meetings and the minimum waiting time may be linear or increase exponentially with the number of meetings.

Thus, in some embodiments of the present invention, the allocating S3 comprises determining that there is a minimum waiting time between the time slot and any other online meeting booked in the event scheduling system 3 for the organizer 2 and/or for any other of the participants. In some embodiments, the minimum waiting time during a time period is dependent on a number of online meetings already booked for the organizer 2, and/or for any other of the participants, in the event scheduling system 3 during said time period, e.g. a day, week or month.

In some embodiments, other participants' schedules are also taken into account when computing the minimum waiting time, e.g. using a weighted average where weight reflects the total number of accepted meetings in the event scheduling system 3 of said time period, e.g. a day, week or month, of all participants (including or excluding the organizer 2).

In some embodiments, the position within the organization 11 of the organizer 2, and/or the other participant(s), is taken into when determining to allocate a meeting token. For example, a vice president may have a higher priority compared to an engineer when booking a meeting. Similarly, the time of the day, or the day of the week, may be considered when determining to allocate a meeting token. Thus, even though the organization has been provided with a number of tokens, members of the organization e.g., organizers or other participants, may have different access to a token for reservation 304 allocation 311 thereof to a meeting, especially in case there are not enough tokens provided for allowing all boking requests made in the event scheduling system 3, e.g., in accordance with a priority list which may be stored in the token computer system 1.

In some embodiments, the online meeting is automatically terminated when the time slot of the allocated meeting token is passed. In some embodiments, the online meeting may be allowed to be extended for a predetermined period of time past the time slot e.g. to allow the participants to wrap up. In some embodiments, a next organizer of a meeting to which the same meeting token is allocated for a subsequent online meeting may terminate the online meeting (possibly after having sent a notification or warning to the meeting on overtime), similar to kicking people out of a physical meeting room when their meeting time is up. Typically, the meeting token allocated to the online meeting is released when the online meeting is finished (regardless of whether it finishes before, on or after the end of the time slot of the meeting). For instance, if the token is released before the end of the time slot, an organizer (the same or another organizer) can use the released token (e.g., allocate it for a meeting which starts before the intended end of the now finished meeting). Conversely, if the meeting ends late, a following meeting using the same token cannot start until the meeting has finished and the token released.

In some embodiments, a shared playback session ends when no additional media content is added to a shared playback queue (e.g., the playlist). For example, during the playback session, participants (e.g., and the organizer/meeting host 2) may add media content items to a shared list (e.g., playback queue) such that all of the participants access (e.g., playback) the same media content from the playback queue at substantially the same time. In some embodiments, after the last item in the shared playback queue has finished playing, if no additional media content is added to the playback queue, the playback session ends (e.g., automatically without user input).

In some embodiments, the meeting token, after having been released due to the online meeting having finished, may be available for a follow-up meeting within a predetermined time after the meeting finished, e.g. within 5 minutes. For example, a new meeting request may be determined to be for a follow-up meeting if at least two participants (including the organizer) of the finished meeting are participants also of the new request.

Thus, in some embodiments of the present invention, the method comprises releasing S5 the allocated S3 meeting token when the online meeting is finished. In some embodiments, the online meeting is automatically finished at the end of the time slot of the online meeting or after a predetermined period of time after the end of the time slot.

Figure 4:
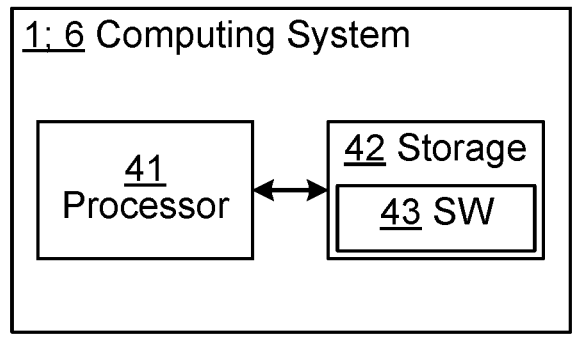
FIG. 4 is a schematic block diagram of a computing system, in accordance with some embodiments of the present invention.

FIG. 4 schematically illustrates an embodiment of a computing system 1 or 6, e.g. comprising event scheduling system 3 and/or a token allocator 4 and/or a token management 5 as discussed herein. The computing system 1 or 6 may be configured to perform any embodiment of the method disclosed herein. The computing system comprises processing circuitry 41 e.g. a central processing unit (CPU). The processing circuitry 41 may comprise one or a plurality of processing units in the form of microprocessor(s). However, other suitable devices with computing capabilities could be comprised in the processing circuitry 41, e.g. an application specific integrated circuit (ASIC), a field programmable gate array (FPGA) or a complex programmable logic device (CPLD). The processing circuitry 41 is configured to run one or several computer program(s) or software (SW) 43 stored in a storage 42 of one or several storage unit(s) e.g. a memory. The storage unit is regarded as a computer readable means 42, forming a computer program product together with the SW 43 stored thereon as computer-executable components, as discussed herein and may e.g. be in the form of a Random Access Memory (RAM), a Flash memory or other solid state memory, or a hard disk, or be a combination thereof. The processing circuitry 41 may also be configured to store data in the storage 42, as needed.

Embodiments of the present invention may be conveniently implemented using one or more conventional general purpose or specialized digital computer, computing device, machine, or microprocessor, including one or more processors 41, memory and/or computer readable storage media 42 programmed according to the teachings of the present disclosure. Appropriate software coding can readily be prepared by skilled programmers based on the teachings of the present disclosure, as will be apparent to those skilled in the software art.

In some embodiments, the present invention includes a computer program product 42 which is a non-transitory storage medium or computer readable medium (media) having instructions 43 stored thereon/in, in the form of computer-executable components or software (SW), which can be used to program a computer to perform any of the methods/processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The present disclosure has mainly been described above with reference to a few embodiments. However, as is readily appreciated by a person skilled in the art, other embodiments than the ones disclosed above are equally possible within the scope of the present disclosure, as defined by the appended claims.

What is claimed is:

1. A method for avoiding bandwidth shortage for online meetings in a communication network, the method comprising:
   via an online event scheduling system, receiving a meeting request for an online meeting from an organizer, said meeting request comprising information about a time slot for and a maximum number of participants of said online meeting;
   in response to the received meeting request, determining whether an organization which the organizer belongs to has a meeting token available for said time slot having a size specifying a maximum number of participants;
   in accordance with a determination that the organization which the organizer belongs to has a meeting token available for said time slot having the size specifying the maximum number of participants, allocating the available meeting token to the requested online meeting; and
   after the allocating, sending an acknowledgement to the online event scheduling system, allowing the online event scheduling system to book the online meeting for the participants in the online event scheduling system;
   wherein a finite number of meeting tokens, including the allocated meeting token, has been provided to the organization based on a communication bandwidth available for said organization, such that a maximum number of concurrent online meetings in the organization is limited by the finite number of meeting tokens.

2. The method of claim 1, wherein the online meeting comprises a video conference.

3. The method of claim 1, wherein the online meeting comprises a shared playback session in which audio is played from a playlist shared among the participants.

4. The method of claim 1, further comprising:
   releasing the allocated meeting token when the online meeting is finished.

5. The method of claim 4, wherein the online meeting is automatically finished at an end of the time slot or after a predetermined period of time after the end of the time slot.

6. The method of claim 1, wherein the allocating comprises determining that there is a minimum waiting time between the time slot and any other online meeting booked in the online event scheduling system for the organizer and/or for any other of the participants.

7. The method of claim 6, wherein the minimum waiting time during a time period is dependent on a number of online meetings already booked for the organizer, and/or for any other of the participants, in the online event scheduling system during said time period.

8. A computing system comprising:
   one or more processors, and
   memory storing instructions executable by said one or more processors, including instructions that cause the computing system to:
   via an online event scheduling system, receive a meeting request for an online meeting from an organizer, said meeting request comprising information about a time slot for and a maximum number of participants of said online meeting;
   in response to the received meeting request, determine whether an organization which the organizer belongs to has a meeting token available for said time slot having a size specifying a maximum number of participants;
   in accordance with a determination that the organization which the organizer belongs to has a meeting token available for said time slot having the size specifying the maximum number of participants, allocate the available meeting token to the requested online meeting; and
   after the allocating, send an acknowledgement to the online event scheduling system, allowing the online event scheduling system to book the online meeting for the participants in the online event scheduling system;
   wherein a finite number of meeting tokens, including the allocated meeting token, has been provided to the organization based on a communication bandwidth available for said organization, such that a maximum number of concurrent online meetings in the organization is limited by the finite number of meeting tokens.

9. The computing system of claim 8, wherein the online meeting comprises a video conference.

10. The computing system of claim 8, wherein the online meeting comprises a shared playback session in which audio is played from a playlist shared among the participants.

11. The computing system of claim 8, wherein the instructions cause the computing system to:
   release the allocated meeting token when the online meeting is finished.

12. The computing system of claim 11, wherein the online meeting is automatically finished at an end of the time slot or after a predetermined period of time after the end of the time slot.

13. The computing system of claim 8, wherein the allocating comprises determining that there is a minimum waiting time between the time slot and any other online meeting booked in the online event scheduling system for the organizer and/or for any other of the participants.

14. The computing system of claim 13, wherein the minimum waiting time during a time period is dependent on a number of online meetings already booked for the organizer, and/or for any other of the participants, in the online event scheduling system during said time period.

15. A non-transitory computer-readable storage medium storing instructions that, when executed by a computing system with one or more processors, cause the computing system to:

via an online event scheduling system, receive a meeting request for an online meeting from an organizer, said meeting request comprising information about a time slot for and a maximum number of participants of said online meeting;

in response to the received meeting request, determine whether an organization which the organizer belongs to has a meeting token available for said time slot having a size specifying a maximum number of participants;

in accordance with a determination that the organization which the organizer belongs to has a meeting token available for said time slot having the size specifying the maximum number of participants, allocate the available meeting token to the requested online meeting; and after the allocating, send an acknowledgement to the online event scheduling system, allowing the online event scheduling system to book the online meeting for the participants in the online event scheduling system;

wherein a finite number of meeting tokens, including the allocated meeting token, has been provided to the organization based on a communication bandwidth available for said organization, such that a maximum number of concurrent online meetings in the organization is limited by the finite number of meeting tokens.

* * * * *